United States Patent
Kim et al.

(10) Patent No.: US 11,349,678 B2
(45) Date of Patent: May 31, 2022

(54) METHOD, SYSTEM, AND NON-TRANSITORY COMPUTER-READABLE RECORD MEDIUM FOR GENERATING CHATROOM ACCORDING TO CONDITION

(71) Applicant: LINE Plus Corporation, Seongnam-si (KR)

(72) Inventors: Sungwhan Kim, Seongnam-si (KR); Chaewon Jung, Seongnam-si (KR); Hyun Jung Lee, Seongnam-si (KR); Seo Hyun Cho, Seongnam-si (KR); Eun Jung Joung, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 16/901,494

(22) Filed: Jun. 15, 2020

(65) Prior Publication Data

US 2020/0403815 A1    Dec. 24, 2020

(30) Foreign Application Priority Data

Jun. 19, 2019    (KR) .................... 10-2019-0072719

(51) Int. Cl.
*H04L 12/18*      (2006.01)
*H04L 51/046*    (2022.01)
(Continued)

(52) U.S. Cl.
CPC ............ *H04L 12/1818* (2013.01); *G06F 9/54* (2013.01); *G06Q 10/10* (2013.01); *H04L 12/16* (2013.01); *H04L 12/18* (2013.01);
*H04L 12/1813* (2013.01); *H04L 12/1822* (2013.01); *H04L 12/1845* (2013.01); *H04L 29/06027* (2013.01);
(Continued)

(58) Field of Classification Search
CPC . H04L 12/1818; H04L 65/00; H04L 12/1845; H04L 12/16; H04L 12/18; H04L 67/02; H04L 41/5093; H04L 29/06414; H04L 12/1813; H04L 51/04; H04L 29/06027; H04L 41/026; H04L 12/1822; H04L 51/046; G06Q 10/10; G06F 9/54; A63F 13/35; A63F 13/25; A63F 13/87;
(Continued)

(56) References Cited

U.S. PATENT DOCUMENTS 9,805,388 B2 * 10/2017 Joshi .................. G06Q 30/0241
2003/0220972 A1 * 11/2003 Montet .................... H04L 51/04
                                                                    709/204
(Continued)

FOREIGN PATENT DOCUMENTS

KR    10-2014-0096485 A    8/2014
WO    WO-2014206305 A1 * 12/2014    ............. H04L 51/04

*Primary Examiner* — Michael A Keller
(74) *Attorney, Agent, or Firm* — Harness, Dickey & Pierce, P.L.C.

(57) ABSTRACT

Disclosed is a method, system, and non-transitory computer-readable record medium for creating a chatroom according to a condition. The chatroom creation method may include providing an instant messaging service; registering a chatroom creation condition related to a specific account of the instant messaging service; retrieving at least one account of accounts of the instant messaging service that meets the chatroom creation condition; and automatically creating a chatroom of the specific account joined by the retrieved accounts.

20 Claims, 5 Drawing Sheets

(51) Int. Cl.

| | |
|---|---|
| *H04L 65/403* | (2022.01) |
| *H04L 51/04* | (2022.01) |
| *H04L 41/50* | (2022.01) |
| *H04L 41/026* | (2022.01) |
| *H04L 65/1101* | (2022.01) |
| *G06Q 10/10* | (2012.01) |
| *G06F 9/54* | (2006.01) |
| *H04L 67/02* | (2022.01) |
| *H04L 12/16* | (2006.01) |
| *H04L 65/00* | (2022.01) |
| *A63F 13/795* | (2014.01) |
| *A63F 13/87* | (2014.01) |
| *H04N 7/14* | (2006.01) |
| *A63F 13/35* | (2014.01) |
| *A63F 13/25* | (2014.01) |

(52) U.S. Cl.
CPC ...... *H04L 29/06414* (2013.01); *H04L 41/026* (2013.01); *H04L 41/5093* (2013.01); *H04L 51/04* (2013.01); *H04L 51/046* (2013.01); *H04L 65/00* (2013.01); *H04L 67/02* (2013.01); *A63F 13/25* (2014.09); *A63F 13/35* (2014.09); *A63F 13/795* (2014.09); *A63F 13/87* (2014.09); *A63F 2300/556* (2013.01); *A63F 2300/572* (2013.01); *H04N 7/147* (2013.01)

(58) Field of Classification Search
CPC .............. A63F 2300/572; A63F 13/795; A63F 2300/556; H04N 7/147
See application file for complete search history.

(56) References Cited

U.S. PATENT DOCUMENTS

| | | | |
|---|---|---|---|
| 2010/0125580 A1* | 5/2010 | Westen | H04L 51/04 707/737 |
| 2010/0299348 A1* | 11/2010 | Gill | G06F 16/2428 707/769 |
| 2012/0283007 A1* | 11/2012 | Sanders | H04L 12/1845 463/29 |
| 2014/0207888 A1* | 7/2014 | Zheng | H04L 51/046 709/206 |
| 2014/0297766 A1* | 10/2014 | Imes | H04L 51/04 709/206 |
| 2014/0324825 A1* | 10/2014 | Gopinath | G06F 16/3338 707/722 |
| 2015/0074085 A1* | 3/2015 | Bamford | G06F 16/248 707/722 |
| 2015/0088660 A1* | 3/2015 | Song | G06F 3/04842 705/14.64 |
| 2018/0341387 A1* | 11/2018 | Segal | H04L 51/32 |
| 2018/0365627 A1* | 12/2018 | Mansour | G06Q 10/06393 |
| 2019/0028844 A1* | 1/2019 | Annett | H04W 4/14 |
| 2019/0158452 A1* | 5/2019 | Lai | H04L 51/32 |

* cited by examiner

METHOD, SYSTEM, AND NON-TRANSITORY COMPUTER-READABLE RECORD MEDIUM FOR GENERATING CHATROOM ACCORDING TO CONDITION

This U.S. non-provisional application and claims the benefit of priority under 35 U.S.C. § 365(c) to Korean Patent Application No. 10-2019-0072719, filed Jun. 19, 2019, the entire contents of which are incorporated herein by reference in their entirety.

TECHNICAL FIELD

One or more example embodiments relate to a method, system, and/or non-transitory computer readable record medium for automatically creating a chatroom according to a condition.

RELATED ART

A chatroom refers to an Internet space in which users may chat with each other online. Chatrooms may include chatrooms that are open to users through which a personal relationship is established to allow the users to exchange contents online and/or may also include chatrooms that allow strangers to gather and exchange contents based on a specific subject.

SUMMARY

Example embodiments of a chatroom creation method and system that may automatically create a chatroom of a specific account joined by accounts meeting a condition set in association with the specific account, based on the condition.

According to an aspect of at least one example embodiment, there is provided a chatroom creation method including providing an instant messaging service; registering a chatroom creation condition related to a specific account of the instant messaging service; retrieving at least one account of accounts of the instant messaging service that meets the chatroom creation condition; and creating a chatroom of the specific account joined by the retrieved accounts.

The creating the chatroom may be automatic.

The specific account may include an official account of the instant messaging service, and the chatroom creation condition may be set in association with the official account.

The specific account may include an account corresponding to a service connected with the instant messaging service, and the chatroom creation condition may be set by the computer apparatus in association with the connected service.

The creating of the chatroom may include creating the chatroom by automatically inviting the retrieved accounts through a bot corresponding to the specific account.

The chatroom creation condition may be associated with at least one of (1) location information received from terminals associated with the accounts of the instant messaging service, (2) at least a portion of user profiles corresponding to the accounts of the instant messaging service, and (3) a number of users to join the chatroom.

The method may further include registering a chatroom join condition of at least a portion of the accounts of the instant messaging service. The retrieving may include retrieving at least one account that meets all of the chatroom creation condition and the chatroom join condition.

According to an aspect of at least one example embodiment, there is provided a non-transitory computer-readable record medium storing instructions that, when executed by a processor, cause the processor to perform the method.

According to an aspect of at least one example embodiment, there is provided a computer apparatus including at least one processor configured to execute computer-readable instructions to provide an instant messaging service, register a chatroom creation condition related to a specific account of the instant messaging service, search for accounts of the instant messaging service that meet the chatroom creation condition, and create a chatroom of the specific account joined by the retrieved accounts. The creating the chatroom may be automatic.

According to example embodiments, it is possible to automatically create a chatroom of a specific account joined by accounts meeting a condition set in association with the specific account, based on the condition.

Further areas of applicability will become apparent from the description provided herein. The description and specific examples in this summary are intended for purposes of illustration only and are not intended to limit the scope of the present disclosure.

DETAILED DESCRIPTION

Figure 1:
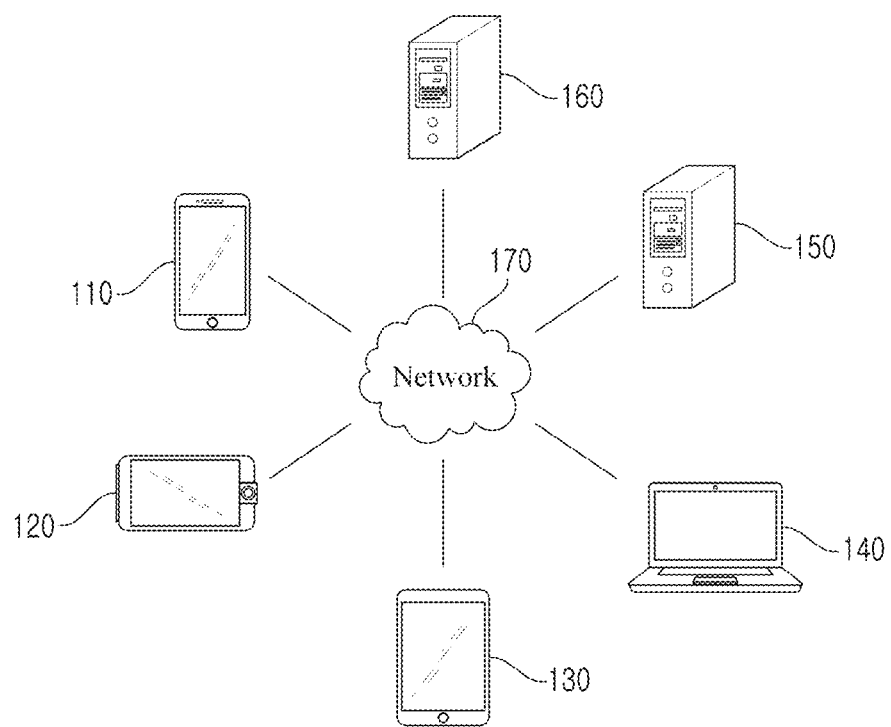
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A chatroom creation system according to some example embodiments may be implemented by at least one computer apparatus, and a chatroom creation method according to the example embodiments may be performed through at least one computer apparatus that implements the chatroom creation system. Here, a computer program according to the example embodiments may be installed and executed on the computer apparatus. The computer apparatus may perform the chatroom creation method under control of the executed computer program. The computer program may be stored in a non-transitory computer-readable record medium to perform the chatroom creation method in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. For example, the number of electronic devices and/or the number of servers may be more or less than illustrated. Also, the network environment of FIG. 1 is provided as an example only among environments applicable to the example embodiments. An environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may include a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless and/or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), Internet, and the like. Also, the network 170 may include, for example, at least one of network topologies that include a bus network, a star network, a ring network, a mesh network, a star-bus network, a tree or hierarchical network, and the like, but is not limited to these examples.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. Here, the service may include, for example, a messaging service, a mail service, a social network service (SNS), a map service, a translation service, a financial service, a payment service, a search service, and a content providing service. Though illustrated as distinct apparatuses, this is merely an example embodiment, and the servers 150 and 160 may be part of the plurality of electronic devices connected to the network 170 in, for example, a peer-to-peer (P2P) architecture.

Figure 2:
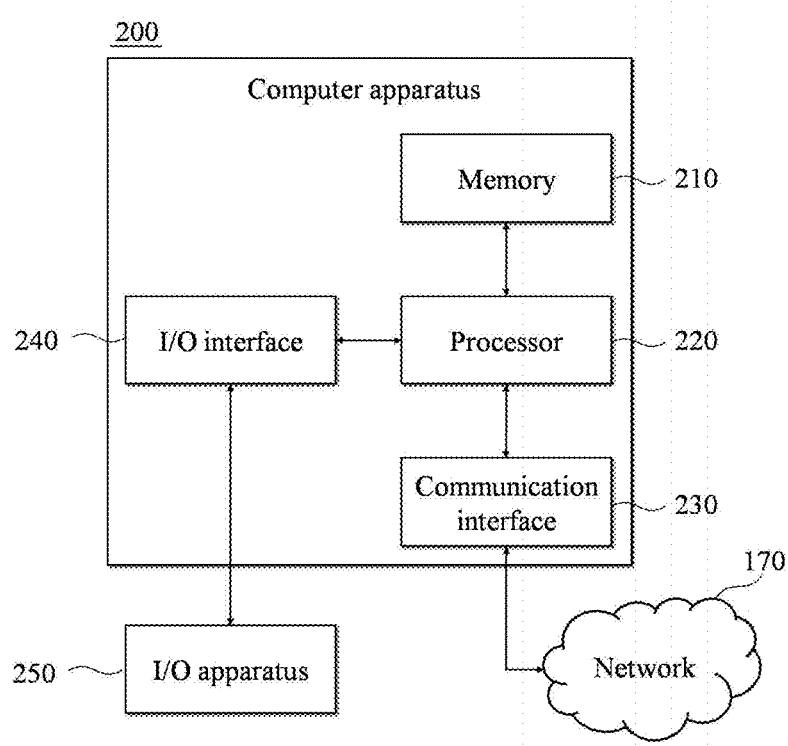
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 and/or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as random access memory (RAM), a read only memory (ROM), and a disk drive, as a non-transitory computer-readable storage medium. The permanent mass storage device, such as ROM and disk drive, may be included in the computer apparatus 200 as a permanent storage device separate from the memory 210. Software components like an operating system (OS) and at least one program code may be stored in the memory 210. The software components may be, for example, loaded to the memory 210 from another non-transitory computer-readable medium separate from the memory 210. The other non-transitory computer-readable storage medium may include, for example, a non-transitory computer-readable storage medium, for example, a floppy drive, a disk, a tape, a DVD/CD-ROM drive, a memory card, etc. According to other example embodiments, software components may be loaded to the memory 210 through the communication interface 230 instead of, or in addition to, the non-transitory computer-readable storage medium. For example, software components may be loaded to the memory 210 of the computer apparatus 200 based on a computer program installed by files received over the network 170.

The processor 220 may include processing circuitry such hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc. For example, the processor may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may be configured to provide and/or facilitate communication between the computer apparatus 200 and another apparatus, for example, the aforementioned storage devices, over the network 170. For example, the processor 220 of the electronic apparatus 200 may transfer data, a file, a request, and/or an instruction based on the program code stored in a storage device, such as the memory 210, to other apparatuses over the network 170 under control of the communication interface 230 and/or the processor 220. Inversely, a signal, an instruction, data, a file, etc., from the other apparatus may be received by the computer apparatus 200 from the network 170 through the communication interface 230. For example, a signal, an instruction, data, etc., received through the communication interface 230 may be transferred to the processor 220 or the memory 210, and a file, etc., may be stored in a storage medium, for example, the permanent mass storage device, further includable in the computer apparatus 200.

The I/O interface 240 may be configured to interface with an I/O apparatus 250. For example, the I/O apparatus 250 may include an input device and/or an output device. The I/O apparatus 250 may comprise a single device as both the input and output devices and/or comprise a plurality of devices. For example, an input device may include a device configured to receive an input, such as a microphone, a keyboard, a mouse, and the like, and an output device may include a device configured to provide an output, such as a display, a speaker, and the like. As another example, the I/O interface 240 may be a device configured to interface with an I/O apparatus 250 in which an input function and an output function are integrated into a single function, such as a touchscreen or a wireless headset.

According to other example embodiments, the computer apparatus 200 may include a number of components greater than or less than a number of components shown in FIG. 2. For example, the computer apparatus 200 may include at least a portion of the I/O apparatus 250, or may further include other components, for example, a transceiver, a database (DB), and the like.

Figure 3:
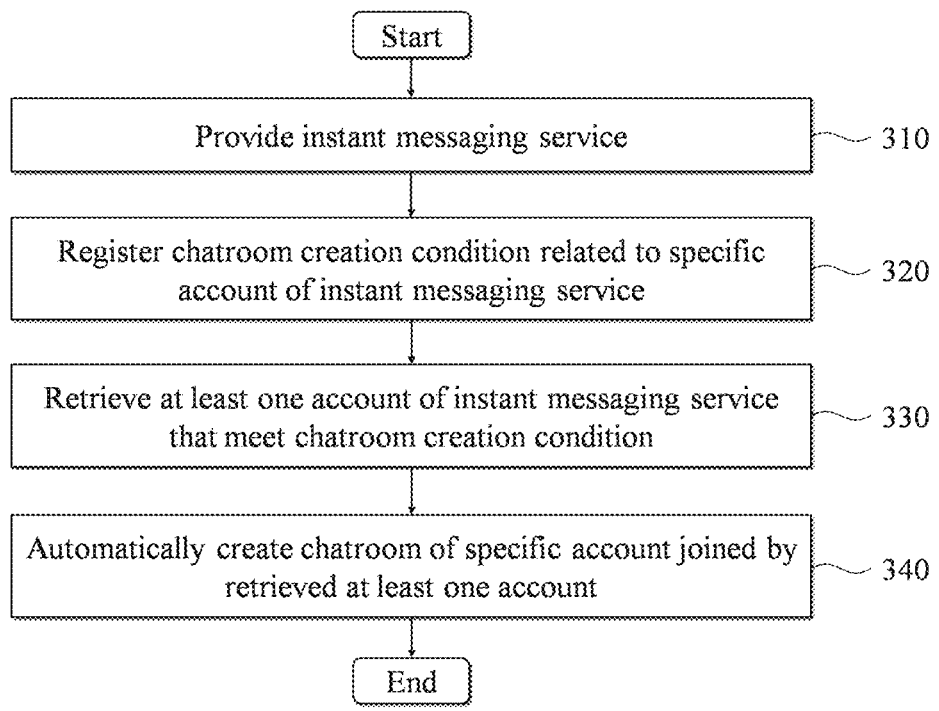
FIG. 3 is a flowchart illustrating an example of an chatroom creation method according to at least one example embodiment.

FIG. 3 is a flowchart illustrating an example of a chatroom creation method according to at least one example embodiment. The chatroom creation method may be performed by the computer apparatus 200 that implements a server. For example, the server may be a system that provides an instant messaging service to a terminal of a user. For example, the processor 220 of the computer apparatus 200 may be configured to execute a control instruction according to a code of at least one program or a code of an OS included in the memory 210. Here, the processor 220 may control the computer apparatus 200 to perform operations 310 to 340 included in the method of FIG. 3 in response to a control instruction provided from a code stored in the computer apparatus 200.

Referring to FIG. 3, in operation 310, the computer apparatus 200 may provide an instant messaging service. For example, the computer apparatus 200 may be a physical device configured to implement the server that provides the instant messaging service to a plurality of users and may manage a plurality of chatrooms opened by the plurality of users. The computer apparatus 200 may manage the plurality of chatrooms by storing an identifier of each of the chatrooms, identifiers of users joining in each of the plurality of chatrooms, and identifiers of messages sent to and received from each of the plurality of chatrooms to be associated with one another. The computer apparatus 200 may also be configured route each of messages sent to and received from the chatrooms through the instant messaging service to be forwarded to a user of a desired destination.

In operation 320, the computer apparatus 200 may register a chatroom creation condition related to a specific account of the instant messaging service. The chatroom creation condition may be set by an official account and registered to the computer apparatus 200 and/or set and registered by the computer apparatus 200 in association with the connected service. For example, the specific account may include an official account (OA) of the instant messaging service. In this example embodiment, the chatroom creation condition may be set by the official account and registered to the computer apparatus 200. For example, if an administrator that operates the official account inputs conditions through a terminal of the administrator, the input conditions may be registered to the computer apparatus 200 in association with the official account. As another example, the specific account may include an account corresponding to a service connected with the instant messaging service. In this example embodiment, the chatroom creation condition may be set and registered by the computer apparatus 200 in association with the connected service. For example, the chatroom creation condition determined through mutual agreement between a provider of the instant messaging service and a provider of the connected service may be input through the computer apparatus 200. The computer apparatus 200 may register the chatroom creation condition in association with the account corresponding to the connected service.

In operation 330, the computer apparatus 200 may retrieve at least one account of the instant messaging service that meets the chatroom creation condition. For example, the chatroom creation condition may be associated with at least one of (1) at least a portion of user profiles corresponding to the accounts of the instant messaging service, (2) location information received from terminals associated with the accounts of the instant messaging service, and (3) a number of users to join the chatroom. For example, if a chatroom creation condition, "4 males" among "males in their 20s" present in a "place A," is registered with respect to an official account, the computer apparatus 200 may perform a primary search for accounts present in the "place A" based on (2) location information received from terminals associated with the accounts of the instant messaging service and then may perform a secondary search for an account having a user profile of "male in their 20s" from among the primarily retrieved accounts. Here, four accounts among the secondarily retrieved accounts may be selected as accounts that meet the chatroom creation condition.

In some example embodiments, the computer apparatus 200 may register a chatroom join condition of each of at least a portion of the accounts of the instant messaging service. In some example embodiments, the registering of the chatroom join condition may be performed prior to operation 330. In these example embodiments, the computer apparatus 200 may search for accounts that meet the chatroom creation condition and, at the same time, the chatroom join condition. For example, users to join an automatically created chatroom may have a condition about a chatroom the users desire to join. For example, a user may desire to join only a chatroom related to a specific "place B" or a chatroom related to a specific official account. Such users may set and register their own chatroom join condition in association with their accounts. Depending on example embodiments, the chatroom join condition may be a simple input of a join intent. In these example embodiments, the input of the join intent may be performed during the progress of operation 330 of searching for accounts without advance registration. Here, the computer apparatus 200 may search for accounts that meet all of a chatroom creation condition registered in association with an account that desires to create a chatroom and a chatroom join condition registered by a participant that is an entity joining the chatroom. Also, with respect to each of accounts that register a specific account as a friend among the accounts of the instant messaging service, the computer apparatus 200 may register a chatroom join condition for allowing a corresponding account to join a chatroom to be automatically created in association with the specific account. For example, the chatroom join condition may be registered in association with a corresponding user account such that the chatroom join condition is determined to be met with respect to the chatroom automatically created in association with the specific account if the specific account of the instant messaging service is registered as a friend by the user of the instant messaging service. For example, if a user 1 adds an official account 1 as a friend, a chatroom join condition for allowing the user 1 to join chatrooms automatically created in association with the official account 1 may be registered in association with an account of the user 1.

As another example, if a specific account is invited to a specific chatroom, the computer apparatus 200 may register a chatroom join condition for allowing a corresponding user to join a chatroom to be automatically created in association with the specific account with respect to at least one of the accounts joined in the specific chatroom. For example, if the specific account of the instant messaging service is invited to the chatroom by the user of the instant messaging service, the computer apparatus 200 may register a chatroom join condition in association with at least one user account joining the corresponding chatroom such that the chatroom join condition is determined to be met with respect to a chatroom to be automatically created in association with the specific account. For example, if a user 2 invites an official account 2 to a chatroom joined by a user 2, user 3, and a user 4, a chatroom join condition for allowing at least one of the user 2, the user 3, and the user 4 to join chatrooms automatically created in association with the official account 2 may be registered in association with an account of at least one of the user 2, the user 3, and the user 4.

In operation 340, the computer apparatus 200 may create a chatroom of the specific account joined by the retrieved accounts. For example, the computer apparatus 200 may create a chatroom by automatically inviting the retrieved accounts through a bot corresponding to the specific account. In the chatroom, users meeting a condition desired by an entity that creates the chatroom may gather. Therefore, the entity that creates the chatroom may provide intended information to users that meet the condition desired by the entity or may recommend contents sharable among users joining the chatroom. For example, users desiring car-sharing in a specific region may gather in a chatroom and be provided with a car-sharing service. In this case, since the users gather in the chatroom, the users may share opinions about the car-sharing service. Also, since users having a common matter of interest automatically gather in a single chatroom, the users may discuss various shared content, such as, for example, a joint purchase of a product or a service account.

Figure 4:
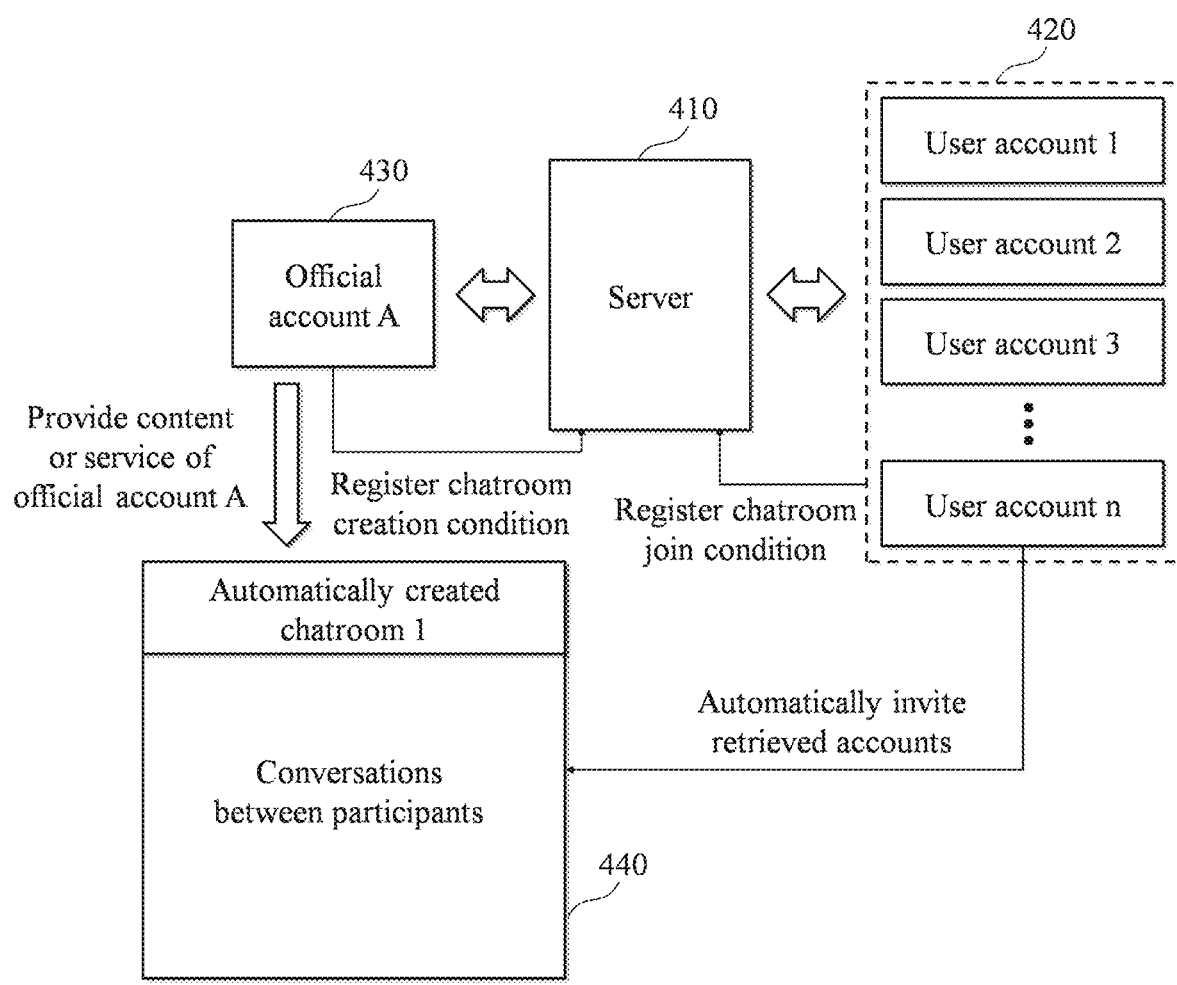
FIG. 4 illustrates an example of a chatroom creation process according to at least one example embodiment.

FIG. 4 illustrates an example of a chatroom creation process according to at least one example embodiment. Referring to FIG. 4, a server 410 may be a system that provides an instant messaging service between user accounts 420 or between the user accounts 420 and an official account 430 that is an official account A. Here, through the server 410, a plurality of chatrooms joined by at least one account may be created, deleted, and maintained, and messages exchanged in the chatroom may be routed.

The official account 430 may register a chatroom creation condition to the server 410. Likewise, at least a portion of the user accounts 420 may register a chatroom join condition. For example, the server 410 may create an automatically created chatroom 1 440 by searching for and verifying user accounts that meet all of the chatroom creation condition and the chatroom join condition, and by automatically inviting the retrieved accounts through a bot corresponding to the official account A. Here, content and/or a service of the official account A may be provided to the automatically created chatroom 1 440. The content and/or the service may be determined based on a chatroom creation purpose. For example, if a chatroom is joined by accounts of four individuals in their 20s among individuals in their 20s present in a specific place A, a coupon available for 4 users in association with the specific place A may be provided. As another example, information or a function for a delivery service associated with the specific place A may be provided through the chatroom. Also, discussion about content or a service may be made through conversations between users joining a chatroom that is automatically created.

Figure 5:
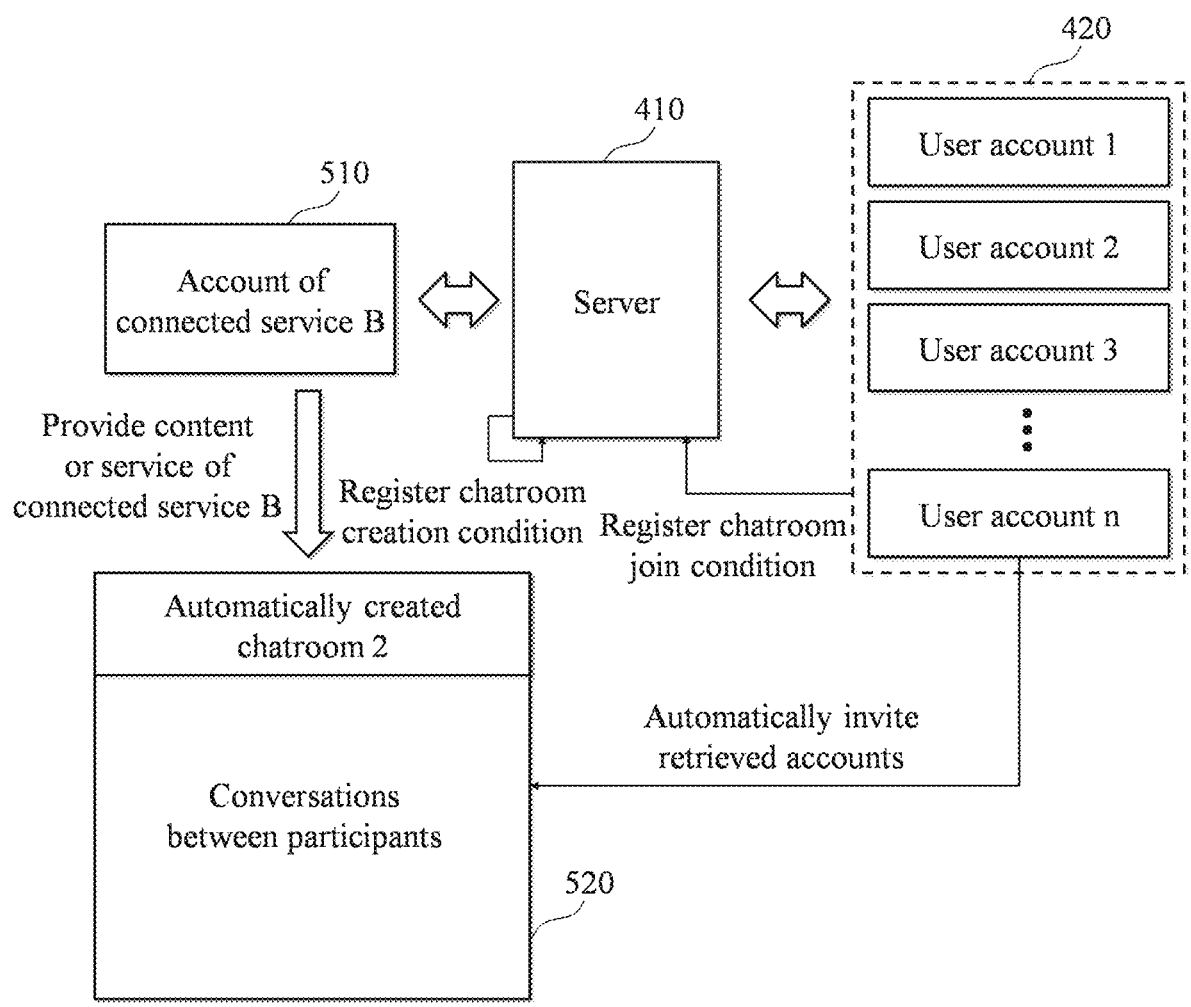
FIG. 5 illustrates an example of a chatroom creation process according to at least one example embodiment.

FIG. 5 illustrates an example of a chatroom creation process according to at least one example embodiment. Referring to FIG. 5, services connected with the instant messaging service provided from the server 410 may be present. The services provided from the server 410 may be provided in addition to the content and/or services provided by the official account 430 of FIG. 4. For example, a variety of services, such as a game service or a gift shop, associated with the instant messaging service, may be present. For example, a chatroom creation condition may be set and registered by the server 410. FIG. 5 illustrates an example of registering, by the server 410, a chatroom creation condition about an account 510 of a connected service B. Likewise, at least a portion of the user accounts 420 may register a chatroom join condition. Here, the server 410 may be configured to create an automatically created chatroom 2 520 for the account 510 of the connected service B. The content and/or a service of the connected service B may be provided to the automatically created chatroom 2 520. Discussion about content or a service may be made through conversation between users joining the automatically created chatroom 2 520.

As described above, according to some example embodiments, it is possible to automatically create a chatroom of a specific account joined by accounts meeting a condition set in association with the specific account, based on the condition.

The systems and/or apparatuses described above may include processing circuitry such as hardware including logic circuits; a hardware/software combination such as a processor executing software; or a combination thereof configured to implement the operations described above. For example, the apparatuses and the components described herein may include processing circuity, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The operations and methods, as described above, may be implemented, for example, by the processing circuitry. The processing circuitry may be configured to run an operating system (OS) and/or software applications that run on the OS. The processing circuitry also may be configured to access, store, manipulate, process, and/or create data in response to execution of the software. For simplicity, the description of a processing circuitry is described as singular; however, one skilled in the art will be appreciated that a processing circuitry may include multiple processing elements and/or multiple types of processing elements. For example, a processing circuitry may include multiple processors, circuitry configured to execute a virtual processor, and/or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also be included, alone or in combination with the program instructions, data files, data structures, and the like. The media may continuously store computer-executable programs or may temporarily store the same for execution or download. Also, the media may be stored on various types of recording devices or storage devices in a form in which one or a plurality of hardware components are combined. Without being limited to media directly connected to a computer system, the media may also be distributed over the network. Examples of the media storage mediums include magnetic media such as hard disks, floppy disks, and magnetic tapes; optical media such as CD-ROM and DVDs; magneto-optical media such as floptical disks; and hardware devices that are configured to store and perform program instructions, such as read-only memory (ROM), random access memory (RAM), flash memory, and the like. Examples of other media may include recording media and storage media managed by Appstores that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An automatic chatroom creation method of a computer apparatus comprising at least one processor, the method comprising:
    providing an instant messaging service;
    registering a chatroom creation condition related to a specific account of the instant messaging service in response to receiving an input including the chatroom creation condition for creating a chatroom;
    retrieving at least one account of the instant messaging service that meets the chatroom creation condition;
    creating the chatroom associated with the specific account joined by the retrieved at least one account; and
    providing at least one of content or service associated with the specific account,
    wherein the retrieving the at least one account of the instant messaging service includes the computer apparatus automatically searching for accounts of the instant messaging service that meet all of the chatroom creation condition and chatroom join conditions,
    wherein the at least one of content or service is based on the chatroom creation condition.

2. The method of claim 1, wherein creating the chatroom is automatic.

3. The method of claim 1, wherein the specific account comprises an official account of the instant messaging service, and
    the chatroom creation condition is set in association with the official account.

4. The method of claim 1, wherein the specific account comprises an account corresponding to a service connected with the instant messaging service, and the chatroom creation condition is set by the computer apparatus in association with the connected service.

5. The method of claim 1, wherein the creating of the chatroom comprises creating the chatroom by automatically inviting the retrieved at least one account through a bot corresponding to the specific account.

6. The method of claim 1, wherein the chatroom creation condition is associated with at least one of location information received from terminals associated with accounts of the instant messaging service, at least a portion of user profiles corresponding to the accounts of the instant messaging service, and a number of users to join the chatroom.

7. The method of claim 1, further comprising:
registering the chatroom join condition of at least a portion of the accounts of the instant messaging service.

8. The method of claim 7, wherein the registering of the chatroom join condition includes registering a condition allowing a corresponding account to join the chatroom for accounts that register the specific account as a friend.

9. The method of claim 7, wherein the registering of the chatroom join condition includes registering a condition for allowing a corresponding account to join the chatroom to be automatically created in association with the specific account with respect to at least one of the accounts joined a specific chatroom, in response to the specific account being invited to the specific chatroom.

10. The method of claim 1, wherein
searching for accounts includes a primary search and a secondary search,
the primary search including a search of the accounts that meet the chatroom creation condition, and
the secondary search including a search of the accounts retrieved in the primary search.

11. A non-transitory computer-readable record medium storing instructions that, when executed by at least one processor, cause the at least one processor to perform the method of claim 1.

12. A computer apparatus comprising:
at least one processor configured to execute computer-readable instructions to provide an instant messaging service,
register a chatroom creation condition related to a specific account of the instant messaging service in response to receiving an input including the chatroom creation condition for creating a chatroom,
retrieve at least one account of the instant messaging service that meets the chatroom creation condition,
create the chatroom associated with the specific account joined by the retrieved at least one account; and
providing at least one of content or service associated with the specific account,
wherein the retrieve at least one account of the instant messaging service includes an automatic search, by the computer apparatus, for accounts of the instant messaging service that meet all of the chatroom creation condition and chatroom join condition,
wherein the at least one of content or service is based on the chatroom creation condition.

13. The computer apparatus of claim 12, wherein the creating the chatroom is automatic.

14. The computer apparatus of claim 12, wherein the specific account comprises an official account of the instant messaging service, and
the chatroom creation condition is set in association with the official account.

15. The computer apparatus of claim 12, wherein the specific account comprises an account corresponding to a service connected with the instant messaging service, and
the chatroom creation condition is set by the computer apparatus in association with the connected service.

16. The computer apparatus of claim 12, wherein the at least one processor is further configured to
register the chatroom join condition of at least a portion of the accounts of the instant messaging service.

17. The computer apparatus of claim 16, wherein the registering the chatroom join condition includes registering a condition allowing a corresponding account to join the chatroom for accounts that register the specific account as a friend.

18. The computer apparatus of claim 16, wherein the registering of the chatroom join condition includes registering a condition for allowing a corresponding account to join the chatroom to be automatically created in association with the specific account with respect to at least one of accounts joined in a specific chatroom, in response to the specific account being invited to the specific chatroom.

19. The computer apparatus of claim 12, further comprising memory configured to provide the at least one processor with the computer-readable instructions.

20. The computer apparatus of claim 12, wherein the chatroom creation condition is associated with at least one of location information received from terminals associated with accounts of the instant messaging service or a number of users to join the chatroom.

* * * * *